June 2, 1925. 1,540,083
H. A. ORR
CHECKING EYEPIECE ATTACHMENT FOR GUN SIGHT TELESCOPES
Filed Jan. 17, 1920
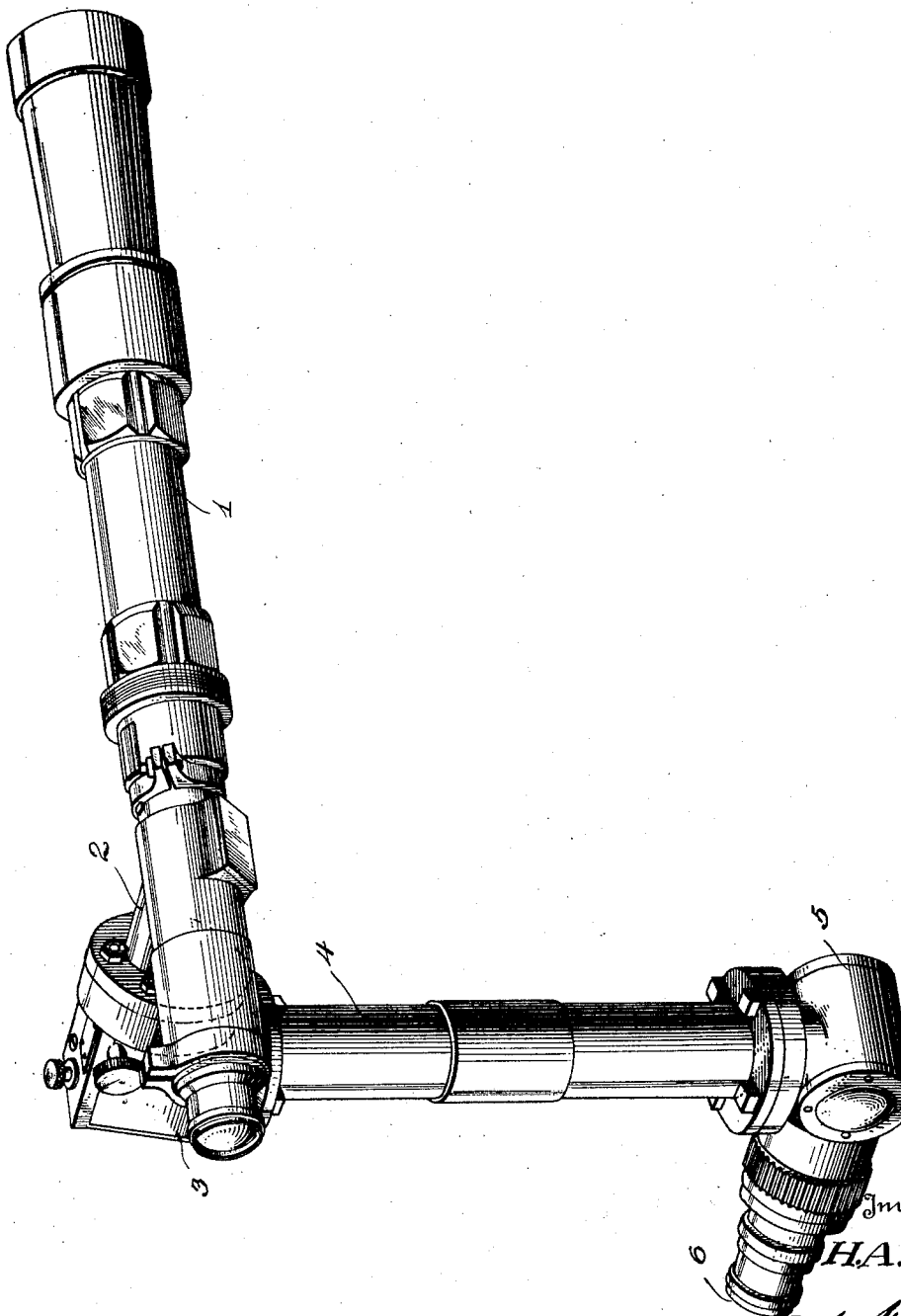
Inventor
H.A.Orr
By
Attorney Patented June 2, 1925.

1,540,083

UNITED STATES PATENT OFFICE.

HENRY A. ORR, OF THE UNITED STATES NAVY.

CHECKING-EYEPIECE ATTACHMENT FOR GUN-SIGHT TELESCOPES.

Application filed January 17, 1920. Serial No. 352,210.

*To all whom it may concern:*

Be it known that I, HENRY A. ORR, a citizen of the United States, commander in the United States Navy, have invented a certain new and useful Checking-Eyepiece Attachment for Gun-Sight Telescopes; and I do declare the following to be a full, clear, and exact description of the same, reference being had to the accompanying drawings, forming a part of this specification, and to the characters of reference thereon.

My invention relates to the pointing of a gun, and more particularly to checking the point of aim to which the gun is laid at the instant of firing.

The aiming of a large gun, technically known as laying the gun, is a necessary procedure in firing such a weapon, and on many gunsight telescopes used in the United States Navy there has been provided an attachment, in which is carried an additional eyepiece, called a checking eyepiece, by means of which the officer in charge of the gun, or other responsible person, can check the point of aim of the gun the instant it is fired.

Heretofore, the design of checking eyepiece attachment used, consisted of an elbow extending in a straight line away from the gunsight telescope, and such design necessarily required the eye to observe directly towards the axis of the gunsight telescope. In this manner the position of the head of the person observing through the checking eyepiece was restricted to one position only, in relation to the axis of the gunsight telescope.

The object of the present invention is to provide means for checking the point of aim of the gun, by use of a checking eyepiece so designed that the observer's head will not necessarily be restricted to face directly towards the axis of the gunsight telescope.

My improved design of a checking eyepiece attachment for a gunsight telescope is based on the proposition that, by the application of the principle of reflection, in which the line of sight through the checking eyepiece attachment is reflected by means of prisms of optical glass, or other reflecting medium; the checking eyepiece itself can be mounted at any angular position desired in relation to the line of sight through the gunsight telescope.

In the drawings, there is shown a single view in perspective of the complete apparatus.

Referring to the drawings, 1 is a gunsight telescope, 2 is an elbow extending from the main body tube gunsight telescope known in the art on gunsight telescopes fitted with checking eyepieces, 3 is a prism housing which indicates the point where my invention begins, 4 is a tube extension, 5 is a prism housing and 6 is a checking eyepiece.

In the practical use of this improved checking eyepiece attachment, the observer places the eye at the checking eyepiece 6, whereas until my invention was made, the checking eyepiece 6 was located directly on a straight extension of the elbow 2, which required the observer to place the eye directly in line with the elbow 2. This made the earlier type of checking eyepieces impracticable for use on some mountings. In observing through the eyepiece 6, the line of sight is reflected at 5 by means of a prism or other reflecting surface into the tube 4, until it strikes a reflecting surface located in the prism housing 3, from which the line of sight emerges along the axis of the elbow 2 and into the gunsight telescope 1.

Having thus fully described my invention, what I claim as new, and desire to secure by Letters Patent, is:—

In combination with a main telescopic gun sight, a checking eyepiece therefor comprising a portion extending to one side of said gun sight telescope, a second portion extending at right angles downwardly therefrom and a third portion including an eyepiece positioned at right angles to said second portion and extending laterally with respect to the line of sight whereby said checking eyepiece is operable from a point below and at right angles to the main telescope.

HENRY A. ORR.

Witnesses:
GUSSIE SPINGARN,
JULIUS APPLEBAUM.